US012321505B2

(12) United States Patent
Kulkarni et al.

(10) Patent No.: US 12,321,505 B2
(45) Date of Patent: Jun. 3, 2025

(54) SYSTEMS AND METHODS FOR CHASSIS INTRUSION DETECTION

(71) Applicant: Microsoft Technology Licensing, LLC, Redmond, WA (US)

(72) Inventors: Anand Avinash Kulkarni, Sammamish, WA (US); Priya Raghu, Renton, WA (US); Christopher Lawrence Weimer, Redmond, WA (US); Christy Felix Pradeep Antony, Mississauga (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 17/228,407

(22) Filed: Apr. 12, 2021

(65) Prior Publication Data

US 2022/0327249 A1 Oct. 13, 2022

(51) Int. Cl.
*G06F 21/86* (2013.01)
*G06F 21/33* (2013.01)
*G11C 5/14* (2006.01)

(52) U.S. Cl.
CPC ............ *G06F 21/86* (2013.01); *G06F 21/33* (2013.01); *G11C 5/14* (2013.01)

(58) Field of Classification Search
CPC .. G06F 21/86; G06F 2221/2143; G06F 21/33; G06F 21/64; G06F 1/263; G06F 21/72
USPC ....................................................... 726/23, 2
See application file for complete search history.

(56) References Cited

U.S. PATENT DOCUMENTS

| 5,430,882 A | * | 7/1995 | Tilghman | ................ | G11C 7/22 |
| | | | | | 702/6 |
| 7,000,118 B1 | * | 2/2006 | Murthy | .................. | G06F 21/64 |
| | | | | | 713/185 |
| 8,201,266 B2 | * | 6/2012 | Campbell | ............ | G08B 13/189 |
| | | | | | 414/790 |
| 8,461,863 B2 | * | 6/2013 | Pedersen | ............... | G06F 21/755 |
| | | | | | 326/8 |
| 10,127,409 B1 | * | 11/2018 | Wade | ...................... | G06F 21/75 |
| 10,306,753 B1 | * | 5/2019 | Fadden | ................ | H01L 23/576 |
| 10,496,854 B1 | * | 12/2019 | Lillestolen | ............. | H05K 1/165 |
| 11,449,264 B2 | * | 9/2022 | Strong | .................... | G06F 21/78 |
| 2005/0120245 A1 | * | 6/2005 | Torisaki | ............... | H04L 9/0891 |
| | | | | | 726/4 |
| 2006/0059372 A1 | * | 3/2006 | Fayar | ..................... | G06F 21/72 |
| | | | | | 713/192 |

(Continued)

OTHER PUBLICATIONS

Maximintegrated, DeepCocerSecurityManagerwithI2CInterfaceand 1KBNonimprintingBattery-BackedEncryptionKeySRAM, DS3640Datasheet,pp. 1-3, YR: 2017.*

(Continued)

*Primary Examiner* — Lizbeth Torres-Diaz
(74) *Attorney, Agent, or Firm* — RAY QUINNEY & NEBEKER P.C.; Paul N. Taylor (57) ABSTRACT

A computing device includes an intrusion switch and a battery-backed volatile memory. The battery-backed volatile memory is configured to indicate a physical intrusion when the physical intrusion is detected by the intrusion switch. The triggering of the intrusion switch interrupts a power supply to the battery-backed volatile memory. A method of detecting hardware intrusion in a computing device is also described.

21 Claims, 5 Drawing Sheets

(56) References Cited

U.S. PATENT DOCUMENTS

| | | | |
|---|---|---|---|
| 2006/0087882 A1* | 4/2006 | Kinsley | G11C 7/1045 |
| | | | 365/185.04 |
| 2010/0017621 A1* | 1/2010 | Crawford | G06F 21/72 |
| | | | 713/189 |
| 2010/0316029 A1* | 12/2010 | Kappler | H04W 8/12 |
| | | | 370/338 |
| 2012/0131673 A1* | 5/2012 | Caci | G06F 21/86 |
| | | | 726/23 |
| 2019/0004901 A1* | 1/2019 | Ryan | G06F 1/3253 |
| 2019/0012490 A1* | 1/2019 | Khatri | H04L 9/0643 |
| 2019/0089724 A1* | 3/2019 | Norton | G06F 1/189 |
| 2019/0236271 A1* | 8/2019 | Shivanna | H04L 9/0863 |
| 2019/0318133 A1* | 10/2019 | Lulic | H04L 9/0894 |
| 2019/0361605 A1* | 11/2019 | Kanno | G06F 3/0688 |
| 2020/0029208 A1* | 1/2020 | Winoto | H04W 12/06 |
| 2020/0258358 A1* | 8/2020 | Beck | G06F 21/86 |
| 2020/0351087 A1* | 11/2020 | Mccandlish | H04L 9/0891 |
| 2021/0321303 A1* | 10/2021 | Nair | H04L 63/0281 |
| 2022/0327249 A1* | 10/2022 | Kulkarni | G06F 21/86 |

OTHER PUBLICATIONS

"International Search Report & Written Opinion issued in PCT Application No. PCT/US22/021234", Mailed Date: Jun. 17, 2022, 10 Pages.

* cited by examiner

SYSTEMS AND METHODS FOR CHASSIS INTRUSION DETECTION

BACKGROUND

Background and Relevant Art

Cloud-based services include computing devices at proprietary sites as well as customer sites around the globe. Different sites have different levels of physical security. The server computer is a point of data vulnerability, as the physical devices may be accessed and/or modified without the operator of the network being able to monitor the physical security of the device.

In some server deployments, the servers are exposed to this vulnerability where someone can access the front I/O components and/or remove thumbscrews at the front to open a chassis cover and access or tamper with components inside the server computer chassis.

BRIEF SUMMARY

In some embodiments, a computing device includes an intrusion switch and a battery-backed volatile memory. The battery-backed volatile memory is configured to indicate a physical intrusion when the physical intrusion is detected by the intrusion switch. The triggering of the intrusion switch interrupts a power supply to the battery-backed volatile memory.

In some embodiments, a method of detecting hardware intrusion in a computing device includes receiving a signal from an intrusion switch and, after receiving the signal from the intrusion switch, modifying a key stored in memory of a baseboard management controller (BMC). The method further includes indicating that the system has been compromised by providing a secure indication of intrusion.

In some embodiments, a method of verifying the integrity of a computing device includes creating a token at a security controller of the computing device, transmitting the token to an authenticator for signing, and receiving a signed token from the authorized entity. In response to receiving the signed token, the method further includes generating a key with the security controller; and storing a first copy of the key in battery-backed volatile memory of the computing device. The battery-backed volatile memory is interruptible by an intrusion switch configured to detect physical intrusion into the computing device chassis, such that the battery-backed volatile memory is cleared when the intrusion switch is triggered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to systems and methods for detecting and reporting a physical intrusion into a computing device chassis. Data network intrusion can occur by physical intrusion into one or more computing devices in communication with the data network. For example, a server computer or networking device may be physically compromised, such as by introduction of a foreign component into an expansion slot, an input-output interface, direct soldering onto a motherboard or other component of the computing device, or through other intrusion into the chassis of the computing device. The foreign component or connection may, then, be able to access the data network through the credentials or allowances of the computing device. By detecting physical intrusion or alteration of the computing device and requiring authentication of the device prior to granting access to the data network, the security of the data network can be retained, even in the event of a physical security breach.

Figure 1:
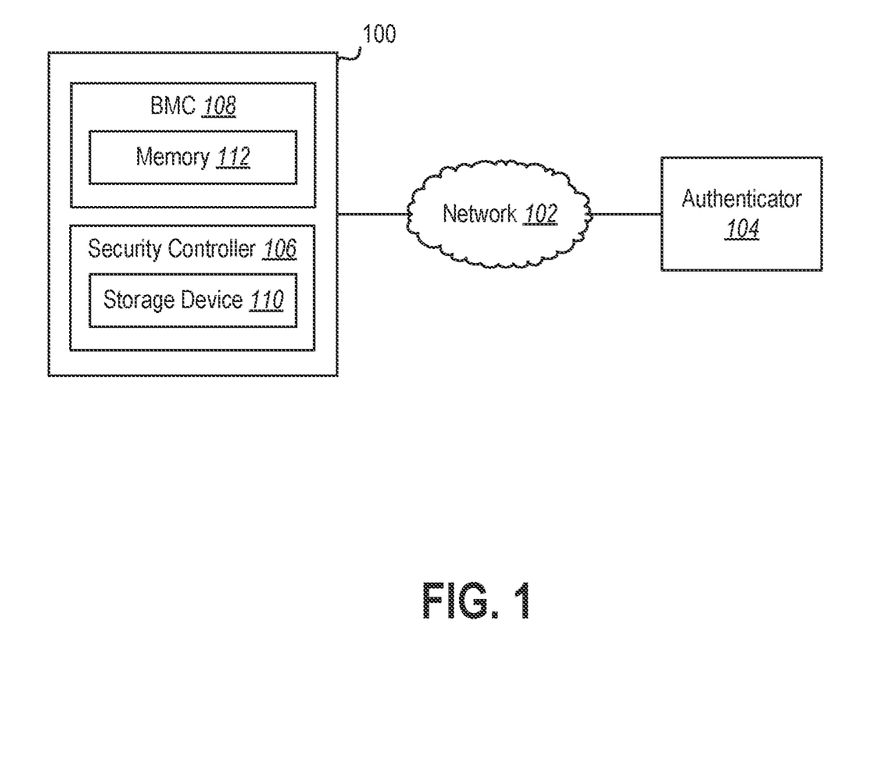
FIG. 1 is a schematic view of a system for verifying the integrity of a computing device on a network, according to at least some embodiments of the present disclosure.

Referring now to FIG. 1, in some embodiments, a computing device 100 in communication with a data network 102 requires a security token to be verified with a remotely-located authenticator 104 service or individual. Only after the security token is signed by the authenticator 104 can the intrusion state of the computing device 100 be reset and the physical security of the computing device 100 be confirmed. The security token is generated by a security controller 106 of the computing device 100 in response to an authorization request from the data network. The security controller 106 provides the authorization token to the network 102 along with device certificates for the electronic components of the computing device 100. The data network provides the token and device certificates to an authorized remotely-located authenticator 104 service or individual. Upon validation of the token, the token is signed by the authenticator 104 service or individual and returned to the security controller 106 of the computing device 100 via the data network 102.

Upon receiving the signed token, the security controller 106 may generate a key, which is transmitted to a baseboard management controller (BMC) 108 and stored locally on volatile memory 112 of the computing device 100. In some embodiments, the volatile memory 112 is integrated into or included in the BMC 108, such as illustrated in the embodiment of FIG. 1. In some embodiments, the volatile memory 112 of the computing device 100 is independent of the BMC 108. For example, the volatile memory 112 may be independent of the BMC 108 and the security controller 106 may transmit the key to and/or communicate with the volatile memory 112 directly. In at least one example, the volatile memory 112 is integrated into and/or included in the security controller. While the embodiment illustrated in FIG. 1 and other embodiments described herein describe the volatile memory 112 as part of the BMC 108, it should be understood that the systems and methods described herein may operate with volatile memory 112 independent of the BMC 108 and/or integrated into the security controller 106.

Figure 2:
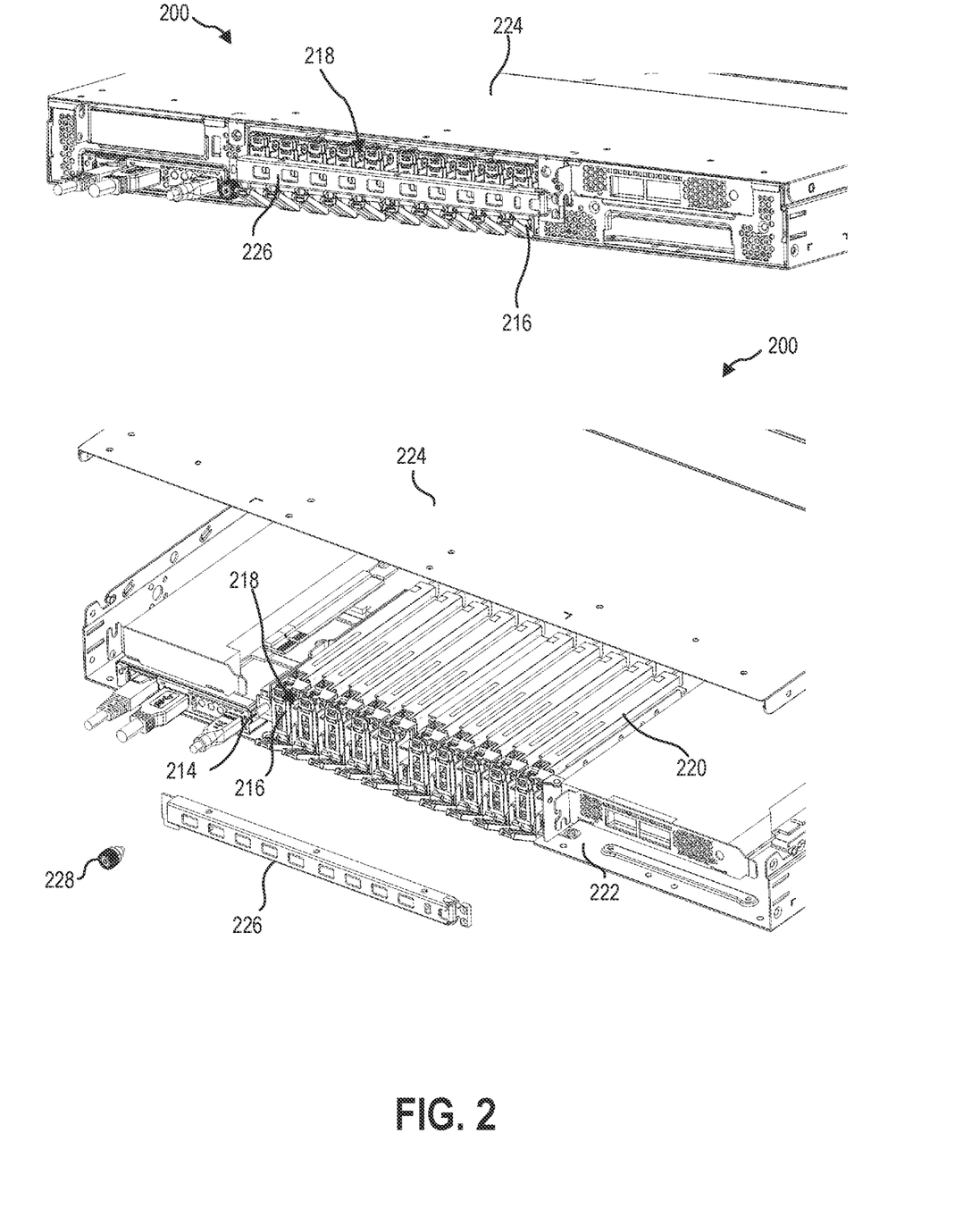
FIG. 2 is a perspective assembled and exploded view of a computing device with an intrusion switch, according to at least some embodiments of the present disclosure.

The BMC 108 and/or volatile memory 112 are in communication with an intrusion switch (described in relation to FIG. 2). When the intrusion switch detects physical intrusion or modification of the computing device, the key stored in the volatile memory 112 is modified. The security controller 106 can compare an encrypted copy of the key stored on a hardware storage device 110 of the security controller 106 against the copy stored on the volatile memory 112 associated with the intrusion switch. For example, the security controller 106 can initiate a comparison upon startup of the computing device 100 and/or at preset intervals during operation. If the keys do not match, an intrusion is reported.

In some embodiments, a data computing or data storage system includes at least one computing device in data communication with a data network or cloud. The data network or cloud is further in communication with an authenticator service or individual that is located remotely to the computing device. The authenticator service or individual is authorized to authenticate a token and/or device certificates provided by the computing device via the data network. The computing device may be a personal computer. In some embodiments, the computing device is a server computer or server blade located in a datacenter. The server computer may be located in a server rack or other assemblage of computing devices. While the datacenter building can provide physical security for the computing devices, in some embodiments, edge-of-the-cloud computing devices and/or datacenters are not directly overseen or controlled by the company or individuals managing the data network. Remote control of device authentication and access to the data network can allow the managing entity to ensure security of the data network in the event physical security is compromised.

FIG. 2 is a perspective view of a computing device 200 according to some embodiments of the present disclosure. The computing device 200 includes an intrusion switch 214 configured to detect when one or more components of the computing device 200 are physically accessed. In some embodiments, the intrusion switch 214 is configured to detect when a hot-swappable component 216 or port 218 is accessed. In some embodiments, the intrusion switch 214 is configured to detect when a component or cover 220 of the computing device 200 is moved or removed from the chassis 222. In some embodiments, the intrusion switch 214 is configured to detect when a housing 224 of the computing device 200 is opened to access the chassis 222.

In some embodiments, the computing device 200 includes one or more intrusion prevention mechanisms 226 that bar or impair physical access to one or more components of the computing device. Some examples include a bar or cover that extends across an expansion slot or input-outlet (I/O) port 218 of the computing device 200. For example, the computing device 200 may have an I/O port 218 positioned on a face of the computing device 200 for connecting an electronic device or additional component to the computing device 200. In other examples, the computing device 200 may have a plurality of expansion slots on a motherboard that allow modification and/or upgrading of the computing device through the addition or replacement of computing components. Access to the ports and expansion slots, or the modification of existing components in the ports and expansion slots, can allow unauthorized access to the contents of the computing device and/or data network.

In some embodiments, the computing device 200 may include a bar, a plate, or other intrusion prevention mechanism 226 that crosses the I/O port(s), physically restricting access to the I/O port(s). In some embodiments, a bar, a plate, or other intrusion prevention mechanism is positioned over and/or in one or more expansion slot(s) to restrict access to the expansion slot(s). In some embodiments, the entire computing device 200 is contained within a housing 224, a cover, or other intrusion prevention mechanism 226 that limits and/or prevents access to the port(s) or expansion slot(s).

The bar 226 or plate may be secured to a frame of the computing device by mechanical fasteners 228 at one or both ends, and an intrusion switch 214 is configured to detect removal of the mechanical fasteners, such as pins, clips, clamps, screws, bolts, or threaded rods. In a particular example, the intrusion prevention mechanism 226 is retained by thumbscrews that allow removal and fixation of the intrusion prevention mechanism 226.

The intrusion switch 214 may be a limit switch that detects the removal of the mechanical fastener 228. For example, the intrusion switch 214 may be positioned to contact an axial end of the thumbscrew. When the thumbscrew is rotated and moved axially out of the threaded hole, the longitudinal end of the thumbscrew may move away from the intrusion switch 214 and release the intrusion switch 214, triggering the intrusion switch 214. In other examples, a clip may hold the intrusion prevention mechanism in place on the frame on the computing device. The clip may compress the intrusion switch, where removal of the clip from the intrusion prevention mechanism and/or the frame releases the intrusion switch.

In some embodiments, the intrusion switch 214 is configured to detect removal of the bar or plate, whether or not mechanical fasteners are used. For example, a surface or protrusion of the bar, plate, or other intrusion prevention mechanism may contact the intrusion switch. Removing the bar, plate, or other intrusion prevention mechanism in any manner may trigger the intrusion switch. In some embodiments, the intrusion switch is a magnetic switch or a Hall sensor that detects the presence of the bar, plate, or other intrusion prevention mechanism proximate a portion of the frame. A bar across the I/O ports of the computing device may be forced, broken, bent, cut, or otherwise displaced from the frame to access the ports without removing the fasteners securing the bar to the frame. In such an example, a magnetic intrusion switch may detect the movement of the bar relative to the frame when a mechanical switch contacting the fastener(s) may not.

Other examples of intrusion switches include optical sensors, electrical circuit sensors, or other devices to detect access to one or more components of the computing device.

In at least one embodiment, the intrusion switch includes an optical sensor that detects the presence of the bar, plate, or other intrusion prevention mechanism. The optical sensor may be an infrared (IR) sensor or other optical sensor that detects an IR light reflected from an interior surface of a bar, plate, or other intrusion prevention mechanism. When the bar, plate, or other intrusion prevention mechanism is moved relative to the frame, the optical sensor ceases detection of the reflected light, which triggers the intrusion switch. Conversely, an optical sensor may be configured to trigger at the detection of IR light. In at least one embodiment, the optical sensor is located inside a housing of the computing device. Upon opening or removal of the computing device housing, the optical sensor may detect the exposure of the components to light, indicating an intrusion.

In at least one example, a computing device includes an intrusion switch that includes an electrical circuit. Opening the electrical circuit by damaging a trace or wire may indicate an intrusion. For example, a bar positioned across the I/O ports may have an electrical potential applied thereto. In such an example, the bar, plate, or other intrusion prevention mechanism becomes the intrusion switch and removal, breaking, or cutting of the bar, plate, or other intrusion prevention mechanism opens the circuit and indicates an intrusion. In another example, a grid of electrical traces may be positioned on a cover or panel of the computing device housing that, should the cover or panel be damaged during an intrusion, can break and open the electrical circuit to indicate an intrusion. In at least one embodiment, the computing device includes a plurality of intrusion switches to detect a plurality of potential types of intrusions. In some embodiments, the intrusion switch is a normally-open switch. For example, a closed state may indicate an intrusion. A normally-open switch may allow the instruction circuit to consume less power. In some embodiments, the intrusion switch is a normally-closed switch.

The computing device includes a BMC in data communication with the intrusion switch(es). The BMC is a specialized controller that is integrated or embedded into the motherboard of the computing device. The BMC manages the interface between system-management software and platform hardware. In some embodiments, the BMC includes volatile memory. Volatile memory is a type of computer memory that requires power to maintain the stored information. Volatile memory retains the stored information while powered on but when the power is interrupted or removed, the stored information degrades and/or is lost. In some embodiments, the volatile memory is a battery-backed volatile memory, such as battery-backed static random-access memory (BBSRAM). Battery-backed volatile memory maintains a power source when the computing device or system is powered off. Therefore, a battery-backed volatile memory allows the volatile memory to remain powered when the computing device in which the memory is incorporated is powered off. BBSRAM is backed up with a battery in the event of power failure. Discrete BBSRAM places SRAM chips on a small printed circuit board (PCB) along with the battery and switchover circuit. In BBSRAM the battery is securely integrated with the memory. BBSRAM modules encapsulate the SRAM, battery and circuitry into chip packages that are smaller than the discrete BBSRAM boards. BBSRAM is, therefore, more secure than a traditional structure where an external power source is not integrated with a memory, as the power source in BBSRAM is on-chip with the memory.

In at least one embodiment, the BBSRAM of the computing device is in electrical communication with the intrusion switch. Triggering the intrusion switch may terminate power to the volatile memory, causing modification of and/or loss of the data stored thereon. The modification of the data stored on the BBSRAM may, therefore, occur whether the intrusion switch is triggered when the computing device is powered or not powered. Additionally, the modification of the data stored on the BBSRAM may occur in response to removal of the battery.

Figure 3:
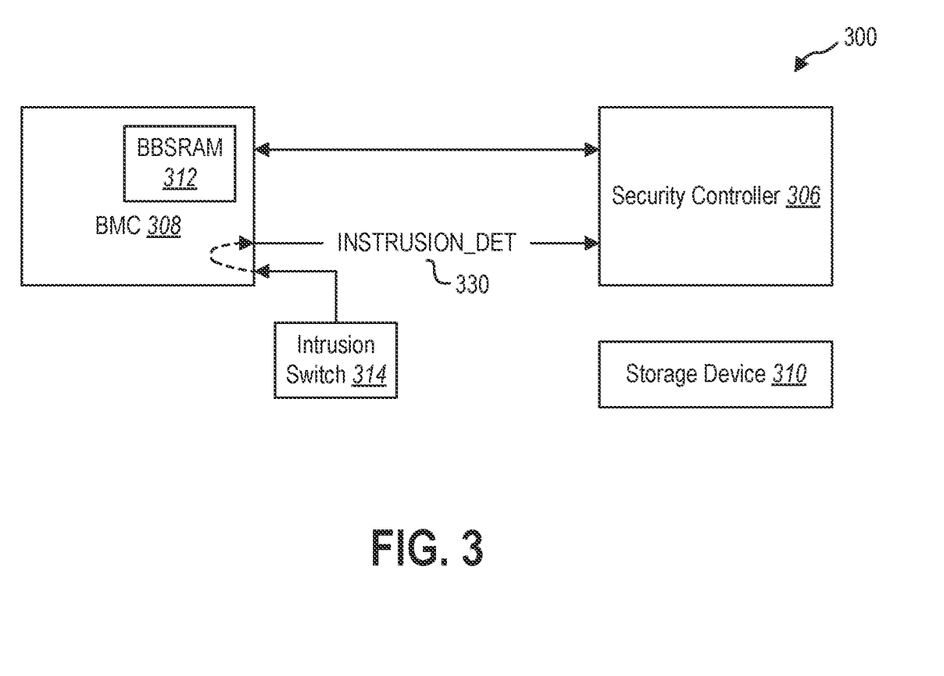
FIG. 3 is a schematic view of a system for detecting chassis intrusion in a computing device, according to at least some embodiments of the present disclosure.

FIG. 3 is a schematic representation of the electrical communication in an embodiment of a computing device 300 between the intrusion switch 314 and the BMC 308. The intrusion switch 314 may send a signal to the BMC 308, which indicates a potential physical intrusion into the computing device 300. In some embodiments, the signal modifies and/or clears the data of the BBSRAM 312 of the BMC 308.

The computing device 300 includes a security controller 306, which is in data communication with the BMC 308. In some embodiments, the security controller 306 includes a hardware storage device and/or is in communication with a hardware storage device 310. In some embodiments, the hardware storage device(s) 310 is a non-transient storage device including any of RAM, ROM, EEPROM, magnetic disk storage or other magnetic storage devices, or any other medium which can be used to store data which can be accessed by a processor or controller.

When the computing device 300 is powered on, in response to receiving an intrusion detection 330, a confirmation request, or at a predetermined interval, the security controller 306 can compare the first copy of the key stored on the hardware storage device 310 in communication with the security controller 306 against the second copy of the key. If the intrusion switch 314 has been triggered, the second copy of the key stored on the volatile memory 312 is modified, and the comparison will fail, indicating an intrusion into the computing device 300 and/or the components thereof.

In some embodiments, the BMC will indicate to the security controller that the intrusion switch has been triggered. For example, the BMC 308 may send an intrusion detection 330 indication to the security controller 306 if the BBSRAM 312 has been cleared by the intrusion switch 314 being triggered. The security controller 306 may then report the intrusion in a platform configuration register. Host attestation will be able to determine the intrusion state through the existing framework by adding this measurement to the attestation policy.

Figure 4:
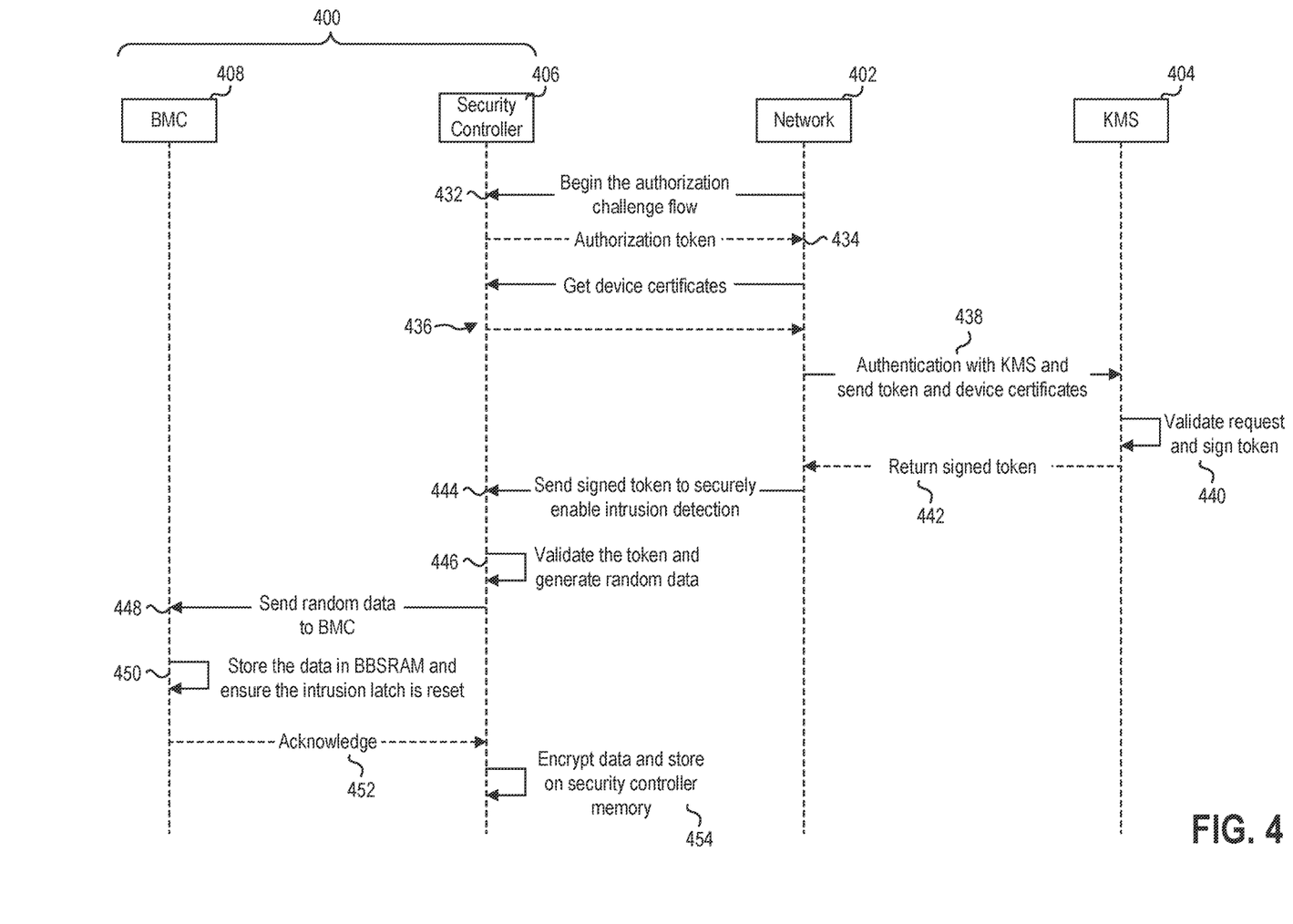
FIG. 4 is a flowchart of a method of validating a computing device and enabling intrusion detection on the computing device, according to at least some embodiments of the present disclosure.

While embodiments of a computing device with at least one intrusion switch have been described herein, some methods of verifying the integrity of a computing device use an embodiment of a described computing device with network communications. In some embodiments, a method of initializing an intrusion detection system includes generating and signing a token, such as illustrated in the flowchart of FIG. 4. The method may begin by receiving an authentication challenge, at 432, from a network 402 source. The security controller 406, in response to receiving the authentication challenge, provides an authentication token and transmits the authentication token to the requesting network source at 434. In some embodiments, the security controller further transmits device certificates at 436 that allow for identification and certification of one or more components of the computing device.

The authentication token is transmitted by the computing device to an authenticator 404 service or individual at 438. In some embodiments, the authenticator 404 service or individual is authorized to authenticate a token and/or device certificates provided by the computing device via the data network. In at least one embodiment, the authenticator 404 service or individual is a key management service (KMS). The authenticator 404 service or individual receives and signs the token at 440 before returning the signed token to the security controller via the data network at 442. The signed token verifies the computing device for communication with other devices, which are in data communication with the data network.

When the signed token is received by the security controller 406 at 444, the security controller generates a first copy of a key to be used to monitor intrusions at 446. The key may be a random string or value. In some embodiments, the key includes processor registers to identify one or more processors of the computing device. For example, the processor register may include a list of the one or more processors of the computing device. In some embodiments, the key is a randomly-generated key between 32 and 128 bytes long. A copy of the key is transmitted from the security controller 406 to the BMC 408 at 448. The BMC stores the second copy of the key in the volatile memory (e.g., the BBSRAM described herein) and ensures the intrusion latch is reset at 450. After the BMC acknowledges the receipt and storage of the second copy of the key at 452, the security controller may encrypt the first copy of the key and store the encrypted copy of the key on a hardware storage device in data communication with the security controller at 454.

Because the security controller will only generate the key and communicate with the BMC after receiving a signed token, the intrusion detection is reset after the computing device is verified on the network. In the event of an intrusion, the second copy of the key is modified, and the first copy of the key and the second copy of the key will no longer match. The intrusion detection can then report the intrusion to management services via the data network.

Figure 5:
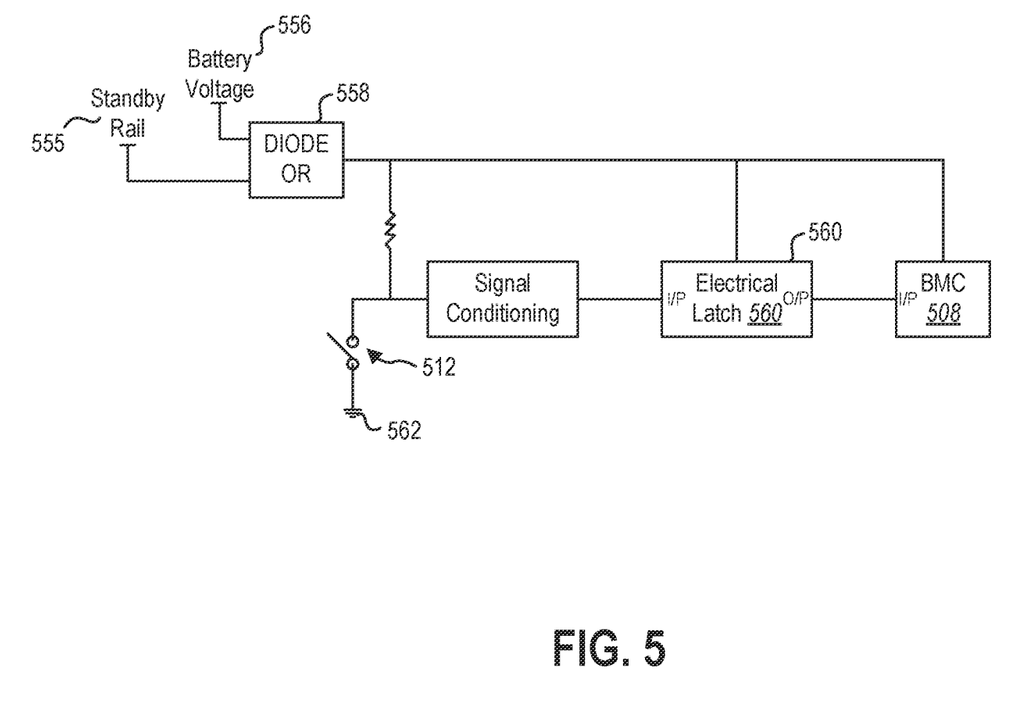
FIG. 5 is a circuit diagram of an intrusion detection system, according to at least some embodiments of the present disclosure.

FIG. 5 is a schematic representation of the electrical circuit of the intrusion switch 514 and BMC 508. Modification of the key can occur by triggering the intrusion switch 514 while the computing device is powered, while the computing device is unpowered, or by removal of the battery that powers the volatile memory. The BMC 508 receives power from a standby power source 555 while the computing device is powered. In some embodiments, a battery 556 provides power through a diode 558 to an electrical latch 560 and to the BMC 508 containing the volatile memory while the standby power source 555 does not provide power to the BMC 508 (e.g., when the computing device is powered off).

In some embodiments, the intrusion switch 514 provides an electrical ground 562 to the circuit. When the intrusion switch 514 is closed, the switch 514 reports an intrusion. The closing of the switch 514 to the electrical ground 562 causes the data stored on the volatile memory to be modified and/or erased.

In some embodiments, the BBSRAM contents are cleared in two situations. First, when the intrusion switch is asserted. During normal run-time, the BMC will receive this switch assertion and immediately clear the BBSRAM contents. If the switch assertion occurs while the system is powered off, the first BMC code (i.e. U-Boot) will inspect the latch state and clear the SRAM contents if necessary. Second, when the battery maintaining the volatile memory state is removed or tampered with, such that the power to the volatile memory of the BMC is interrupted.

After the computing device is powered on, the security controller may determine if there has been an intrusion event through a challenge to the BMC. To generate the challenge response, the BMC may hash the BBSRAM contents, including a random freshness seed included in the challenge, and send the result back to the security controller. The security controller may compare this hash against the encrypted data in the hardware storage device connected to the security controller to see if the BBSRAM state (e.g., data stored thereon) is valid.

INDUSTRIAL APPLICABILITY

The present disclosure relates generally to systems and methods for detecting and reporting a physical intrusion into a computing device chassis. Data network intrusion can occur by physical intrusion into one or more computing devices in communication with the data network. For example, a server computer or networking device may be physically compromised, such as by introduction of a foreign component into an expansion slot, an input-output interface, direct soldering onto a motherboard or other component of the computing device, or through other intrusion into the chassis of the computing device. The foreign component or connection may, then, be able to access the data network through the credentials or allowances of the computing device. By detecting physical intrusion or alteration of the computing device and requiring authentication of the device prior to granting access to the data network, the security of the data network can be retained, even in the event of a physical security breach.

In some embodiments, a computing device in communication with a data network requires a security token to be verified with a remotely-located authenticator service or individual. Only after the security token is signed by the authenticator can the intrusion state of the computing device be reset and the physical security of the computing device be confirmed. The security token is generated by a security controller of the computing device in response to an authorization request from the data network. The security controller provides the security token to the network along with device certificates for the electronic components. The data network provides the token and device certificates to an authorized remotely-located service or individual. Upon validation of the token, the token is signed by the authorized service of individual and returned to the security controller of the computing device via the data network.

Upon receiving the signed token, the security controller may generate a key, which is transmitted to a baseboard management controller (BMC) and stored locally on volatile memory the computing device. In some embodiments, the volatile memory is integrated into or included in the BMC. For example, the volatile memory may be independent of the BMC and the security controller may transmit the key to and/or communicate with the volatile memory directly. In at least one example, the volatile memory is integrated into and/or included in the security controller. In some embodiments, the volatile memory of the computing device is independent of the BMC. While some embodiments described herein describe the volatile memory as part of the BMC, it should be understood that the systems and methods described herein may operate with volatile memory independent of the BMC and/or integrated into the security controller.

The BMC and/or volatile memory are in communication with an intrusion switch. When the intrusion switch detects physical intrusion or modification of the computing device, the key stored in the volatile memory is modified. The security controller can compare an encrypted copy of the key stored on a hardware storage device of the security controller against the copy stored on the volatile memory associated with the intrusion switch. For example, the security controller can initiate a comparison upon startup of the computing device and/or at preset intervals during operation. If the keys do not match, an intrusion is reported.

In some embodiments, a data computing or data storage system includes at least one computing device in data communication with a data network or cloud. The data network or cloud is further in communication with an authenticator service or individual that is located remotely to the computing device. The authenticator service or individual is authorized to authenticate a token and/or device certificates provided by the computing device via the data network. The computing device may be personal computer. In some embodiments, the computing device is a server computer or server blade located in a datacenter. The server computer may be located in a server rack or other assemblage of computing devices. While the datacenter building can provide physical security for the computing devices, in some embodiments, edge-of-the-cloud computing devices and/or datacenters are not directly overseen or controlled by the company or individuals managing the data network. Remote control of device authentication and access to the data network can allow the managing entity to ensure security of the data network in the event physical security is compromised.

The computing device includes an intrusion switch configured to detect when one or more components of the computing device are physically accessed. In some embodiments, the intrusion switch is configured to detect when a hot-swappable component or port is accessed. In some embodiments, the intrusion switch is configured to detect when a component or cover of the computing device is moved or removed from the chassis. In some embodiments, the intrusion switch is configured to detect when a housing of the computing device is opened to access the chassis.

In some embodiments, the computing device includes one or more intrusion prevention mechanisms that bar or impair physical access to one or more components of the computing device. Some examples include a bar or cover that extends across an expansion slot or input-outlet (I/O) port of the computing device. For example, the computing device may have an I/O port positioned on a face of the computing device for connecting an electronic device or additional component to the computing device. In other examples, the computing device may have a plurality of expansion slots on a motherboard that allow modification and/or upgrading of the computing device through the addition or replacement of computing components. Access to the ports and expansion slots, or the modification of existing components in the ports and expansions slots, can allow unauthorized access to the contents of the computing device and/or data network.

In some embodiments, the computing device may include a bar, a plate, or other intrusion prevention mechanism that crosses the I/O port(s), physically restricting access to the I/O port(s). In some embodiments, a bar, a plate, or other intrusion prevention mechanism is positioned over and/or in one or more expansion slot(s) to restrict access to the expansion slot(s). In some embodiments, the entire computing device is contained within a housing, a cover, or other intrusion prevention mechanism that limits and/or prevents access to the port(s) or expansion slot(s).

The bar or plate may be secured to a frame of the computing device by mechanical fasteners at one or both ends, and an intrusion switch is configured to detect removal of the mechanical fasteners, such as pins, clips, clamps, screws, bolts, or threaded rods. In a particular example, the intrusion prevention mechanism is retained by thumbscrews that allow removal and fixation of the intrusion prevention mechanism.

The intrusion switch may be a limit switch that detects the removal of the mechanical fastener. For example, the intrusion switch may be positioned to contact an axial end of the thumbscrew. When the thumbscrew is rotated and moved axially out of the threaded hole, the longitudinal end of the thumbscrew may move away from the intrusion switch and release the intrusion switch, triggering the intrusion switch. In other examples, a clip may hold the intrusion prevention mechanism in place on the frame on the computing device. The clip may compress the intrusion switch, where removal of the clip from the intrusion prevention mechanism and/or the frame releases the intrusion switch.

In some embodiments, the intrusion switch is configured to detect removal of the bar or plate, whether or not mechanical fasteners are used. For example, a surface or protrusion of the bar, plate, or other intrusion prevention mechanism may contact the intrusion switch. Removing the bar, plate, or other intrusion prevention mechanism in any manner may trigger the intrusion switch. In some embodiments, the intrusion switch is a magnetic switch or a Hall sensor that detects the presence of the bar, plate, or other intrusion prevention mechanism proximate a portion of the frame. A bar across the I/O ports of the computing device may be forced, broken, bent, cut, or otherwise displaced from the frame to access the ports without removing the fasteners securing the bar to the frame. In such an example, a magnetic intrusion switch may detect the movement of the bar relative to the frame when a mechanical switch contacting the fastener(s) may not.

Other examples of intrusion switches include optical sensors, electrical circuit sensors, or other devices to detect access to one or more components of the computing device. In at least one embodiment, the intrusion switch includes an optical sensor that detects the presence of the bar, plate, or other intrusion prevention mechanism. The optical sensor may be an infrared (IR) sensor or other optical sensor that detects an IR light reflected from an interior surface of a bar, plate, or other intrusion prevention mechanism. When the bar, plate, or other intrusion prevention mechanism is moved relative to the frame, the optical sensor ceases detection of the reflected light, which triggers the intrusion switch. Conversely, an optical sensor may be configured to trigger at the detection of IR light. In at least one embodiment, the optical sensor is located inside a housing of the computing device. Upon opening or removal of the computing device housing, the optical sensor may detect the exposure of the components to light, indicating an intrusion.

In at least one example, a computing device includes an intrusion switch that includes an electrical circuit. Opening the electrical circuit by damaging a trace or wire may indicate an intrusion. For example, a bar positioned across the I/O ports may have an electrical potential applied thereto. In such an example, the bar, plate, or other intrusion prevention mechanism becomes the intrusion switch and removal, breaking, or cutting of the bar, plate, or other intrusion prevention mechanism opens the circuit and indicates an intrusion. In another example, a grid of electrical traces may be positioned on a cover or panel of the computing device housing that, should the cover or panel be damaged during an intrusion, can break and open the electrical circuit to indicate an intrusion. In at least one embodiment, the computing device includes a plurality of intrusion switches to detect a plurality of potential types of intrusions. In some embodiments, the intrusion switch is a normally-open switch. For example, a closed state may indicate an intrusion. A normally-open switch may allow the instruction circuit to consume less power. In some embodiments, the intrusion switch is a normally-closed switch.

The computing device includes a BMC in data communication with the intrusion switch(es). The BMC is a specialized controller that is integrated or embedded into the motherboard of the computing device. The BMC manages the interface between system-management software and platform hardware. In some embodiments, the BMC includes volatile memory. Volatile memory is a type of computer memory that requires power to maintain the stored information. Volatile memory retains the stored information while powered on but when the power is interrupted or removed, the stored information degrades and/or is lost. In some embodiments, the volatile memory is a battery-backed volatile memory, such as battery-backed static random-access memory (BB SRAM). Battery-backed volatile memory maintains a power source when the computing device or system is powered off. Therefore, a battery-backed volatile memory allows the volatile memory to remain powered when the computing device in which the memory is incorporated is powered off.

In at least one embodiment, the BBSRAM of the computing device is in electrical communication with the intrusion switch. Triggering the intrusion switch may terminate power to the volatile memory, causing modification of and/or loss of the data stored thereon. The modification of the data stored on the BBSRAM may, therefore, occur whether the intrusion switch is triggered when the computing device is powered or not powered. Additionally, the modification of the data stored on the BBSRAM may occur in response to removal of the battery.

The computing device includes a security controller, which is in data communication with the BMC. In some embodiments, the security controller includes a hardware storage device and/or is in communication with a hardware storage device. In some embodiments, the hardware storage device(s) is a non-transient storage device including any of RAM, ROM, EEPROM, magnetic disk storage or other magnetic storage devices, or any other medium which can be used to store data which can be accessed by a processor or controller. The security controller generates a first copy of a key. The key is transmitted to the BMC and a second copy is stored on the volatile memory of the BMC. The first copy is stored on the hardware storage device in communication with the security controller. The first copy of the key on the hardware storage device in communication with the security controller may be encrypted.

When the computing device is powered on, in response to receiving a confirmation request, or at a predetermined interval, the security controller can compare the first copy of the key stored on the hardware storage device in communication with the security controller against the second copy of the key. If the intrusion switch has been triggered, the second copy of the key stored on the volatile memory is modified, and the comparison will fail, indicating an intrusion into the computing device and/or the components thereof.

In some embodiments, the BMC will indicate to the security controller that the intrusion switch has been triggered. For example, the BMC may send an indication to the security controller if the BBSRAM has been cleared by the intrusion switch being triggered. The security controller may then report the intrusion in a platform configuration register. Host attestation will be able to determine the intrusion state through the existing framework by adding this measurement to the attestation policy.

While embodiments of a computing device with at least one intrusion switch have been described herein, some methods of verifying the integrity of a computing device use an embodiment of a described computing device with network communications. In some embodiments, a method of initializing an intrusion detection system includes generating and signing a token. The method may begin by receiving an authentication challenge from a network source. The security controller, in response to receiving the authentication challenge, provides an authentication token and transmits the authentication token to the requesting network source. In some embodiments, the security controller further transmits device certificates that allow for identification and certification of one or more components of the computing device.

The authentication token is transmitted by the computing device to an authorized service or individual. In some embodiments, the authorized service or individual is authorized to authenticate a token and/or device certificates provided by the computing device via the data network. In at least one embodiment, the authorized service or individual is a key management service (KMS). The authorized service or individual receives and signs the token before returning the signed token to the security controller via the data network. The signed token verifies the computing device for communication with other devices, which are in data communication with the data network.

When the signed token is received by the security controller, the security controller generates a first copy of a key to be used to monitor intrusions. The key may be a random string or value. In some embodiments, the key includes processor registers to identify one or more processors of the computing device. In some embodiments, the key is a randomly-generated key between 32 and 128 bytes long. A copy of the key is transmitted from the security controller to the BMC. The BMC stores the second copy of the key in the volatile memory (e.g., the BBSRAM described herein) and ensures the intrusion latch is reset. After the BMC acknowledges the receipt and storage of the second copy of the key, the security controller may encrypt the first copy of the key and store the encrypted copy of the key on a hardware storage device in data communication with the security controller.

Because the security controller will only generate the key and communicate with the BMC after receiving a signed token, the intrusion detection is reset after the computing device is verified on the network. In the event of an intrusion, the second copy of the key is modified, and the first copy of the key and the second copy of the key will no longer match. The intrusion detection can then report the intrusion to management services via the data network.

Modification of the key can occur by triggering the intrusion switch while the computing device is powered, while the computing device is unpowered, or by removal of the battery that powers the volatile memory. In some embodiments, the battery provides power through a diode to an electrical latch and to the BMC containing the volatile memory. In some embodiments, the intrusion switch provides an electrical ground to the circuit. When the intrusion switch is closed, the switch reports an intrusion. The closing of the switch to the electrical ground causes the data stored on the volatile memory to change and/or be erased.

In some embodiments, the BBSRAM contents are cleared in two situations. First, when the intrusion switch is asserted.

During normal run-time, the BMC will receive this switch assertion and immediately clear the BBSRAM contents. If the switch assertion occurs while the system is powered off, the first BMC code (i.e. U-Boot) will inspect the latch state and clear the SRAM contents if necessary. Second, when the battery maintain the volatile memory state is removed or tampered with, such that the power to the volatile memory of the BMC is interrupted.

After the computing device is powered on, the security controller may determine if there has been an intrusion event through a challenge to the BMC. To generate the challenge response, the BMC may hash the BBSRAM contents, including a random freshness seed included in the challenge, and send the result back to the security controller. The security controller may compare this hash against the encrypted data in the hardware storage device connected to the security controller to see if the BBSRAM state (e.g., data stored thereon) is valid.

The present disclosure relates to systems and methods for detecting an intrusion and/or verifying the integrity of a computing device on a network according to at least the examples provided in the sections below:

(A1) In some embodiments, a computing device includes an intrusion switch and a battery-backed volatile memory. The battery-backed volatile memory is configured to indicate a physical intrusion when the physical intrusion is detected. The triggering of the intrusion switch interrupts a power supply to the battery-backed volatile memory.

(A2) In some embodiments, a computing device according to (A1) further includes an intrusion prevention mechanism coupled with the intrusion switch to prevent physical intrusion without triggering the intrusion switch. Bypassing the intrusion prevention mechanism triggers the intrusion switch.

(A3) In some embodiments, the intrusion switch of (A1) or (A2) is an optical switch, a magnetic switch, a limit switch, or other types of switches.

(A4) In some embodiments, the intrusion prevention mechanism of (A2) is a physical restraint covering one or more hot-swappable components of the computing device.

(A5) In some embodiments, the battery-backed volatile memory of any preceding section includes processor registers stored thereon.

(A6) In some embodiments, the intrusion switch of any preceding section connects the battery-backed volatile memory to an electrical ground, which directs current away from the battery-backed volatile memory.

(A7) In some embodiments, a method of detecting hardware intrusion in a computing device includes receiving a signal from an intrusion switch and, after receiving the signal, modifying a key stored in battery-backed static random-access memory (BBSRAM). The method further includes indicating that the system has been compromised by providing a secure indication of intrusion.

(A8) In some embodiments, the method of (A7) includes clearing data from the BBSRAM in response to receiving the signal.

(A9) In some embodiments, the method of (A7) or (A8) includes clearing data from the BBSRAM via a reduction in power to the BBSRAM.

(A10) In some embodiments, the BBSRAM of any of (A7) through (A9) is memory of a baseboard management controller (BMC).

(A11) In some embodiments, the secure indication of intrusion according to any of (A7) through (A10) includes comparing the key in the BBSRAM to a second key in a storage device of a security controller.

(A12) In some embodiments, a method according to (A11) includes, if the key in the BBSRAM, does not match the second key in the storage device of the security controller, reporting an intrusion with the security controller via a platform configuration register.

(A13) In some embodiments, a method according to any of (A7) through (A12) includes initializing first contents of the BBSRAM and second contents of a storage device of a security controller.

(A14) In some embodiments, the method of (A13) includes creating the key at the security controller, sending a copy of the key to the BBSRAM, and encrypting and storing a second copy of the key on the storage device of the security controller.

(A15) In some embodiments, the method of (A14) includes verifying a state of the intrusion switch and returning the key to the security controller before storing the key on the memory of the security controller.

(A16) In some embodiments, a method of verifying the integrity of a computing device includes creating a token at a security controller of the computing device; transmitting the token to an authenticator for signing; and receiving a signed token from the authorized entity. In response to receiving the signed token, the method further includes generating a key with the security controller; and storing a first copy of the key in battery-backed volatile memory of the computing device. The battery-backed volatile memory is interruptible by an intrusion switch configured to detect physical intrusion into the computing device chassis.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
    an intrusion switch configured to detect when one or more components of the computing device are physically accessed;
    a battery-backed static random access memory (BBSRAM) with a first key stored in the BBSRAM, wherein the BBSRAM receives power from a power supply, and the power to the BBSRAM is interruptible by the intrusion switch; and
    a security controller,
    wherein the computing device is configured to:
        receive a signal from the intrusion switch;
        after receiving the signal from the intrusion switch, modify the first key stored in the BBSRAM;
        indicate that the computing device has been compromised by providing a secure indication of intrusion;
        create a token at the security controller;
        transmit the token to an authenticator for signing;
        receive a signed token from the authenticator;
        in response to receiving the signed token, generate a second key at the security controller; and
        store a first copy of the second key in the BBSRAM.

2. The computing device of claim 1,
    wherein the power supply includes a battery and the BBSRAM receives power from the battery, and
    wherein triggering of the intrusion switch terminates the power to the BBSRAM to indicate that a physical intrusion has occurred on the computing device and prevents access to the computing device until intrusion detection is reset after verification of the computing device.

3. The computing device of claim 1, further comprising an intrusion prevention mechanism coupled with the intrusion switch to prevent physical intrusion without triggering the intrusion switch, wherein bypassing the intrusion prevention mechanism causes the intrusion switch to send the signal.

4. The computing device of claim 3, wherein the intrusion prevention mechanism includes a physical restraint covering one or more hot-swappable components of the computing device.

5. The computing device of claim 1, wherein the intrusion switch is an optical switch.

6. The computing device of claim 1, wherein the intrusion switch is a magnetic switch.

7. The computing device of claim 1, wherein the intrusion switch is a limit switch.

8. The computing device of claim 1, wherein the BBSRAM includes processor registers.

9. The computing device of claim 1, wherein the intrusion switch selectively connects the BBSRAM to an electrical ground.

10. The computing device of claim 1, wherein the computing device is further configured to clear data from the BBSRAM in response to receiving the signal.

11. The computing device of claim 10, wherein the data is cleared from the BBSRAM via a reduction in power to the BBSRAM.

12. The computing device of claim 1, wherein the BBSRAM is memory of a baseboard management controller (BMC).

13. The computing device of claim 1, wherein to provide the secure indication of intrusion, the computing device is configured to compare the first key in the BBSRAM to a third key in a storage device of the security controller.

14. The computing device of claim 13, wherein the computing device is further configured to, if the first key in the BBSRAM and the third key in the storage device of the security controller do not match, report an intrusion with the security controller via a platform configuration register.

15. The computing device of claim 1, wherein the computing device is further configured to encrypt and store a second copy of the second key on a storage device of the security controller.

16. The computing device of claim 15, wherein the computing device is further configured to reset a state of the intrusion switch and return the second key to the security controller before storing the second copy of the second key on the storage device of the security controller.

17. A method of detecting physical intrusion of a computing device, comprising:
    receiving a signal from an intrusion switch of the computing device, the signal indicating that one or more components of the computing device are physically accessed;
    after receiving the signal from the intrusion switch, modifying a first key stored in a battery-backed static random access memory (BBSRAM) of the computing device, wherein the BBSRAM receives power from a power supply, and the power to the BBSRAM is interruptible by the intrusion switch;
    indicating that the computing device has been compromised, by providing a secure indication of intrusion;
    creating a token at a security controller of the computing device;
    transmitting the token to an authenticator for signing;
    receiving a signed token from the authenticator;
    in response to receiving the signed token, generating a second key at the security controller; and
    storing a first copy of the second key in the BBSRAM.

18. The method of claim 17, further comprising:
    clearing data from the BBSRAM in response to receiving the signal.

19. The method of claim 17, wherein providing the secure indication of intrusion comprises comparing the first key in the BBSRAM to a third key in a storage device of the security controller.

20. The computing device of claim 17, further comprising:

encrypting and storing a second copy of the second key on a storage device of the security controller.

21. The computing device of claim 20, further comprising:
resetting a state of the intrusion switch and returning the second key to the security controller before storing the second copy of the second key on the storage device of the security controller.

\* \* \* \* \*